(12) United States Patent
Matsuoka

(10) Patent No.: US 7,259,470 B2
(45) Date of Patent: Aug. 21, 2007

(54) POWER CONTROL DEVICE FOR VEHICLE

(75) Inventor: Syougo Matsuoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 239 days.

(21) Appl. No.: 10/963,560

(22) Filed: Oct. 14, 2004

(65) Prior Publication Data

US 2005/0087991 A1 Apr. 28, 2005

(30) Foreign Application Priority Data

Oct. 28, 2003 (JP) .......................... P2003-367813

(51) Int. Cl.
*H02J 11/00* (2006.01)
*F02D 29/06* (2006.01)
*H02P 9/00* (2006.01)
*H02P 9/14* (2006.01)

(52) U.S. Cl. .................................................. 290/40 C

(58) Field of Classification Search ............... 290/40 C
See application file for complete search history.

(56) References Cited

U.S. PATENT DOCUMENTS

| | | | | |
|---|---|---|---|---|
| 4,719,361 A | * | 1/1988 | Brubaker ..................... | 290/45 |
| 4,760,323 A | | 7/1988 | Naoi ........................... | 322/33 |
| 5,183,128 A | * | 2/1993 | Ito et al. ..................... | 180/197 |
| 5,269,391 A | * | 12/1993 | Ito et al. ..................... | 180/197 |
| 5,293,411 A | * | 3/1994 | Miyamoto et al. .......... | 376/210 |
| 5,469,032 A | * | 11/1995 | Otake ......................... | 318/439 |
| 5,672,917 A | * | 9/1997 | Nakano ....................... | 307/116 |
| 5,726,871 A | * | 3/1998 | Choi ........................... | 363/89 |
| 5,903,139 A | * | 5/1999 | Kompelien .................. | 323/282 |
| 5,932,993 A | | 8/1999 | Kouwa et al. ............... | 322/36 |
| 6,018,694 A | * | 1/2000 | Egami et al. ................ | 701/102 |
| 6,131,057 A | * | 10/2000 | Tamaki et al. .............. | 701/22 |
| 6,137,705 A | * | 10/2000 | Maekawa et al. ........... | 363/132 |
| 6,580,239 B1 | * | 6/2003 | Tamaki et al. .............. | 318/434 |
| 6,590,360 B2 | | 7/2003 | Hirata et al. ................ | 318/727 |
| 6,671,760 B1 | * | 12/2003 | Kawasaki et al. .......... | 710/106 |
| 6,747,882 B2 | * | 6/2004 | Tanaka et al. ............... | 363/78 |
| 6,837,230 B2 | * | 1/2005 | Nobe et al. .................. | 123/644 |
| 7,061,247 B2 | * | 6/2006 | Inokuchi et al. ............ | 324/430 |
| 7,075,272 B2 | * | 7/2006 | Sasaki et al. ................ | 322/28 |
| 7,122,914 B2 | * | 10/2006 | Caruthers ................... | 290/40 C |
| 7,129,594 B2 | * | 10/2006 | Iwatani et al. .............. | 290/40 C |
| 2002/0176267 A1 | * | 11/2002 | Tanaka et al. ............... | 363/78 |
| 2003/0202298 A1 | * | 10/2003 | Tamaki et al. .............. | 361/23 |

(Continued)

FOREIGN PATENT DOCUMENTS

DE 10106944 A1 9/2002

(Continued)

*Primary Examiner*—Darren Schuberg
*Assistant Examiner*—Pedro J. Cuevas
(74) *Attorney, Agent, or Firm*—Sughrue Mion, PLLC

(57) ABSTRACT

In a power control device for a vehicle, a monitoring control device 2 disposed separately from a power converter 1 judges normality/abnormality of the power converter 1, and sets an abnormality-occurrence electric generation switching signal 4 to ON/OFF, whereby a first electric generation control function corresponding to an output of power element driving signal generating means is forcedly stopped, and also a second electric generation control function based on a diode rectifying mode of a power element is started.

6 Claims, 7 Drawing Sheets

U.S. PATENT DOCUMENTS

2005/0268164 A1 * 12/2005 Hara .................. 714/14

FOREIGN PATENT DOCUMENTS

| | | | | |
|---|---|---|---|---|
| JP | 55008540 A | * | 1/1980 | |
| JP | 6-178441 A | | 6/1994 | |
| JP | 08237963 A | * | 9/1996 | |
| JP | 11-299123 | | 10/1999 | |
| JP | 2000077086 A | * | 3/2000 | |
| JP | 2002-374678 | | 12/2002 | |

* cited by examiner

FIG. 8

| | STATUS OF CONTROL INSTRUCTING SIGNAL<br>ABNORMALITY DETECTING METHOD<br>POWER CONVERTER JUDGES NORMALITY/ABNORMALITY BY COMPARISON WITH PREDETERMINED SIGNAL PATTERN | STATUS OF STATUS MONITORING SIGNAL<br>ABNORMALITY DETECTING METHOD<br>MONITOR CONTROLLER JUDGES NORMALITY/ABNORMALITY BY COMPARISON WITH PREDETERMINED SIGNAL PATTERN | STATUS OF POWER GENERATION SWITCHING SIGNAL WHEN ABNORMALITY OCCURS<br>MONITOR CONTROLLER CONTROLS OUTPUT | OPERATION OF POWER CONVERTER | | |
|---|---|---|---|---|---|---|
| | | | | FIRST POWER GENERATION CONTROL FUNCTION | SECOND POWER GENERATION CONTROL FUNCTION | ALARM |
| (A) | NORMAL | NORMAL | NORMAL | OPERATION | — | OFF |
| (B) | NORMAL | NORMAL | ABNORMAL (TROUBLE OF TRANSMISSION PATH) | — | OPERATION | ON |
| (C) | NORMAL | ABNORMAL | NORMAL (TROUBLE OF TRANSMISSION PATH) | OPERATION | — | OFF |
| (D) | NORMAL | ABNORMAL | ABNORMAL | — | OPERATION | ON |
| (E) | ABNORMAL | NORMAL | NORMAL | INDEPENDENT OPERATION | — | ON |
| (F) | ABNORMAL | NORMAL | ABNORMAL (TROUBLE OF TRANSMISSION PATH) | — | OPERATION | ON |
| (G) | ABNORMAL | ABNORMAL | NORMAL (TROUBLE OF TRANSMISSION PATH) | INDEPENDENT OPERATION | — | ON |
| (H) | ABNORMAL | ABNORMAL | ABNORMAL | — | OPERATION | ON |

POWER CONTROL DEVICE FOR VEHICLE

BACKGROUND OF THE INVENTION

1. Field of the Invention

The present invention relates to a vehicle power control device mounted in an electrical vehicle or the like, particularly to a vehicle power control device in which the ordinary electric generation function can be switched to the auxiliary electric generation function when abnormality occurs.

2. Description of the Related Art

In an electric powered vehicle such as an electric car or a hybrid car, a motor generator (hereinafter referred to as "M/G") is equipped in place of a conventional diode rectification type electric generator for the high value-added purpose such as driving/braking of a vehicle, starting of a motor and an internal combustion engine mounted on the vehicle, or electric generation for charging a battery, and a power converter (popularly named as inverter) for M/G driving control. A microcomputer, a dedicated LSI or the like is used as means for generating a power element driving signal of the power converter, and many control signal patterns have been proposed in order to simplify the system construction and enhance the energy efficiency.

For example, Patent Document 1 (JP-A-2001-271729 (paragraph 0030 and FIG. 1)) has proposed the following technique. That is, in a case where the shaft of a brushless motor (permanent magnet motor) is linked to the output shaft of an engine and the brushless motor is operated as a starter for the engine, a chopper circuit is set to a non-operation state or operated as a voltage increasing chopper to thereby drive the brushless motor through an inverter circuit. In addition, in a case where the brushless motor is operated as an electric generator, when an electric generation voltage of the brushless motor is higher the voltage of a battery, the inverter circuit is set to a non-operation state and the chopper circuit is made to operate as a high-voltage chopper, thereby charging the battery, and when the electric generation voltage of the brushless motor is lower than the voltage of the battery, the transistor of the chopper circuit is set to an ON-state, and the transistor at the negative side of the inverter circuit is turned on and off, thereby making the inverter circuit operate as a voltage increasing chopper, thereby charging the battery.

Furthermore, Patent Document 2 (JP-A-6-178441 (paragraph 0008 and FIG. 1)) has proposed the following technique. That is, initial excitation at the start time of the internal combustion engine is carried out by an electronic device as a charging control device containing a microcomputer, and the output voltage of an alternating electric generator is controlled to a preset charging voltage of a battery. When the terminal voltage detecting terminal of the battery is slipped, the normal charging voltage control can be performed by using the voltage value of an operating power source of the electronic device, and thus neither a second rectifier nor a dedicated electric circuit is needed. Furthermore, when the charging voltage exhibits an abnormal value with respect to a target charging voltage, a field coil current supplying circuit is enforcedly interrupted to prevent overcharge, and also a charge lamp is turned on and off to warn the driver.

According to these techniques, the voltage of the battery and the charging/discharging amount are controlled on the basis of the signal pattern of the driving signal generating means of the power element such as the inverter circuit or the like which constitutes the power converter. Accordingly, when the power element driving signal generating means of the power converter does not normally function due to breakdown or the like, it is difficult to perform regeneration or electrical generation. Furthermore, even when only the gate signal of the power element is stopped to set the power element to a diode rectifying mode so that the field coil current can be continued to be controllable, the whole electric generation is stopped when the function of the microcomputer is stopped. Furthermore, when the charging to the battery is suddenly stopped, the time which is needed for the driver to move his/her vehicle to a safe place is restricted to a very short time. Conversely, when the current supply of the field coil cannot be stopped, over-excitation occurs, so that a critical defect such as overcharge of the battery or the like as a power source system for a vehicle may be caused.

SUMMARY OF THE INVENTION

The present invention has been implemented in view of the foregoing situation, and has an object to provide a high-reliability power control device for a vehicle with which at the time of occurrence of breakdown of a circuit which is not directly involved in electric generation control, for example, at the time of occurrence of abnormality of a microcomputer or at the time of occurrence of breakdown of an interface circuit between a power converter and a monitoring control device, the breakdown of these circuit is detected and an alarm is emitted to a driver while sufficient power needed for continuous traveling can be supplied without stopping an electrically generating operation which is the main function of the power converter.

In order to attain the above object, a vehicle power control device for controlling driving power and electric generation power of M/G mounted in a vehicle by a power converter containing a power element and power element driving signal generating means for generating a signal to drive the power element, comprises a monitoring control device for monitoring the status of the power converter and outputting an abnormality-occurrence electric generation switching signal when abnormality occurs under the control of the electric generation power of M/G, wherein a first electric generation control function corresponding to the output of the power element driving signal generating means is executed under a state where the abnormality-occurrence electric generation switching signal is not output, and the output of the power element driving signal generating means is stopped when the abnormality-occurrence electric generation switching signal is output, thereby executing a second electric generation control function based on a diode rectifying mode of the power element.

According to the present invention, at the time when the circuit which is not directly involved in the electric generation control breaks down, for example, at the time when abnormality of a microcomputer occurs or at the time when an interface circuit between a power converter and a monitoring control device breaks down, the breakdown is detected and an alarm is emitted to a driver, and also sufficient power needed for continuous traveling can be supplied without stopping the electric generation which is the main function of the power converter, so that there can be provided a vehicle power control device having high reliability.

BRIEF DESCRIPTION OF THE DRAWINGS

FIG. 8 is a diagram showing the operation state between various signals of the vehicle power control device according to the fourth embodiment and the operation status of the power converter.

DETAILED DESCRIPTION OF THE PREFERRED EMBODIMENTS

Preferred embodiments according to the present invention will be described hereunder with reference to the accompanying drawings.

First Embodiment

The basic operation of a power converter 1 is the same or similar to the operation of a device which is generally called as an inverter, and thus the description thereof is omitted. In the following description, the function targeted by the present invention will be taken up and described.

Figure 1:
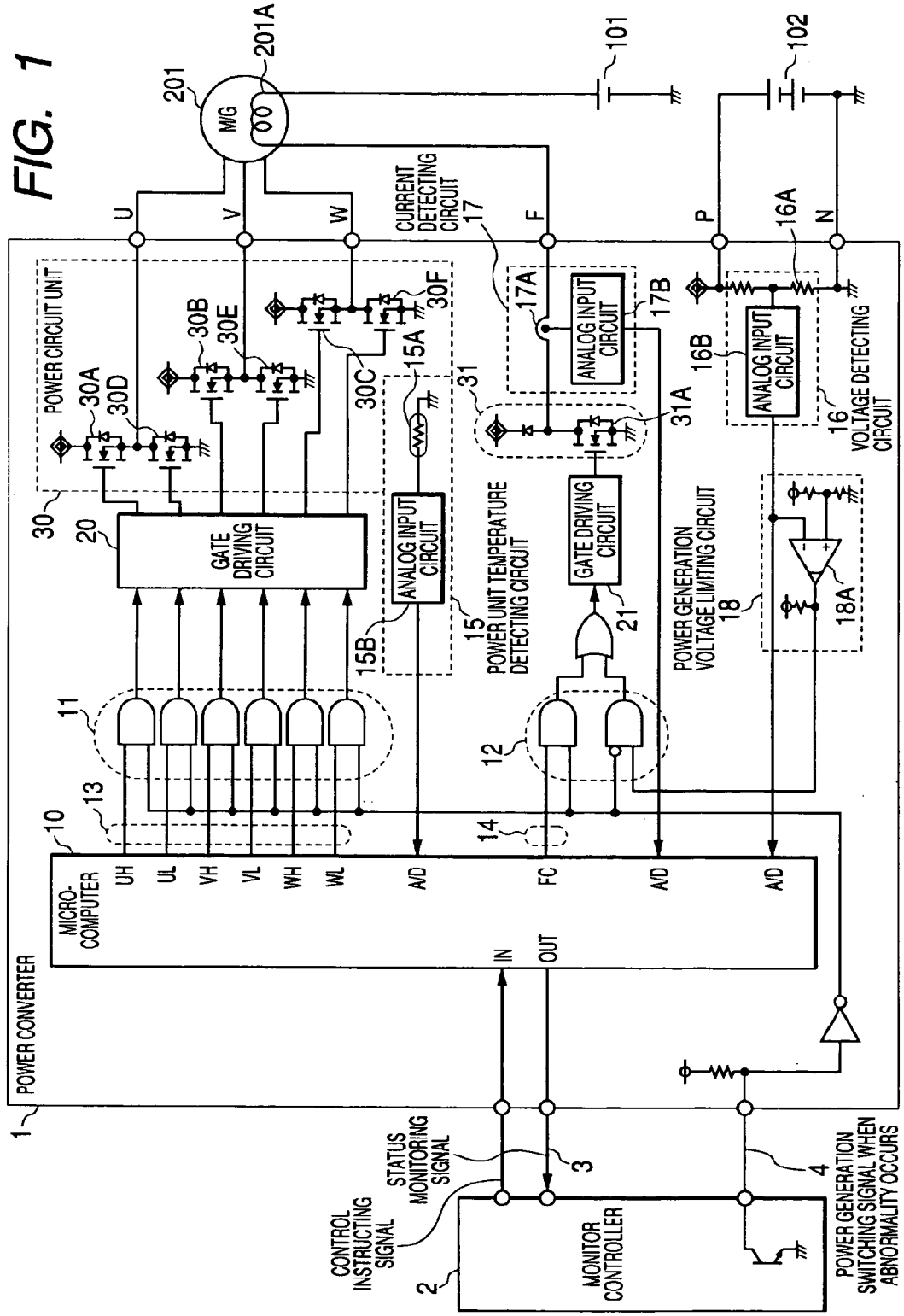
FIG. 1 is a block diagram showing a circuit construction of a vehicle power control device according to a first embodiment of the present invention.

FIG. 1 is a block diagram showing the circuit construction of a vehicle power control device in a system constituting plural power supply systems on the same vehicle. In this power supply system, a low-voltage battery 101 is a 12V battery for supplying a voltage of 12V, and a high-voltage battery 102 supplies a voltage which is equal to or higher than the voltage of the battery 101. For example, the high-voltage battery 102 is a 36V battery. M/G 201 connected to an engine is designed in a field coil type, current to be supplied to the field coil 201A for excitation is supplied from the low-voltage battery 101, and power regenerated by the power converter 1 for controlling the driving of M/G is returned to the high-voltage battery 102.

In FIG. 1, the monitoring control device 2 which can transmit an interactive signal to the power converter device 1 controls the driving of the power converter 1 on the basis of a control instruction signal. When the power converter 1 functions normally, the monitoring control device 2 judges on the basis of the status of a status monitoring signal 3 that no abnormality occurs in the power converter 1, and sets an abnormality-occurrence electric generation switching signal 4 to ON ("normal": transmission signal level is set to Low). At this time, a microcomputer 10 outputs power element gate driving signals 13 from terminals UH to WL as power element driving signal generating means. The power element gate driving signals 13 are passed through an AND logic circuit 11 and then transmitted through a gate driving circuit 20 to power elements 30A to 30F of a power circuit unit 30. Furthermore, a field coil driving signal 14 output from a terminal FC is likewise passed through an AND logic circuit 12 and transmitted through a gate driving circuit 21 to a power element 31A of a field coil driving circuit unit 31.

A microcomputer 10 variably sets a target value of field coil current so that a voltage value fed back from a voltage detecting circuit 16 comprising a voltage dividing resistor 16A and an analog input circuit 16B for detecting a terminal voltage of the high-voltage battery 102 is equal to a predetermined value insofar as the temperature detected by a power unit temperature detecting circuit 15 comprising a temperature detecting sensor 15A and an analog input circuit 15B for detecting the temperature of the power element or the peripheral temperature thereof is equal to a permissible value or less, and also varies the ON/OFF ratio of the driving signal of the terminal FC so that a current value fed back from a current detecting circuit 17 comprising a current detecting sensor 17A and an analog input circuit 17B is coincident with the target value of the field coil current, whereby the first electric generation control function based on the power element driving signal is executed.

In this embodiment, when the microcomputer 10 is inoperative due to some abnormality or breakdown under the state that the electrical generation power of M/G 201 is controlled, the monitoring control device 2 detects the abnormality of the power converter 1 on the basis of the status of the status monitoring signal 3, and sets the abnormality-occurrence electric generation switching signal 4 to OFF ("abnormality": transmission signal level is set to High). As a result, the power element gate driving signals 13 output from the terminals UH to WL of the microcomputer 10 are not passed through the AND logic circuit 11, and thus are not transmitted to the power circuit unit 30. The field coil driving signal 14 output from the terminal FC is not likewise passed through the AND logic circuit 12 and thus is not transmitted to the field coil driving circuit unit 31. That is, the microcomputer 10 is separated from the electric generation power control system of M/G 201, and any output signal of the microcomputer 10 does not affect the electric generation power control system of M/G 201.

In the power circuit unit 30, the power elements 30A to 30F are connected to one another in a diode-connection style to thereby constitute a three-phase full wave rectifying circuit. Therefore, the power circuit unit 30 is kept to a state where the output corresponding to field current can be taken out in a diode rectifying mode. Accordingly, the output of an electric generation power limiting circuit 18 comprising a comparator 18A is set to ON/OFF so that a voltage value fed back from the voltage detecting circuit 16 is equal to a predetermined value, and the field coil driving circuit unit 31 is turned ON/OFF through the microcomputer 10. That is, when the voltage value detected by the voltage detecting circuit 16 is lower than a predetermined value, the field coil driving circuit 31 is turned ON to carry out electric generation. On the other hand, when the voltage is higher than the predetermined value, the field coil driving circuit 31 is turned off and thus no electric generation is carried out, whereby the electric generation can be continued even when the function of the microcomputer 10 is stopped. Accordingly, a second electric generation control function for generating any fixed voltage which is based on the diode rectifying mode of the power elements is executed.

In the first embodiment described above, the monitoring control device 2 which is disposed separately from the power converter 1 judges normality/abnormality of the power converter 1, and sets the abnormality-occurrence electric generation switching signal to ON/OFF, thereby freely controlling the abnormality-occurrence electric generation switching signal for forcedly stopping the first electric generation control function and starting the second electric generation control function.

Furthermore, when the transmission line of the abnormality-occurrence electric generation switching signal 4 is broken, the logical construction is established like the monitoring control device 2 sets the abnormality-occurrence electric generation switching signal 4 to OFF ("abnormality": the state that the first electric generation control function is forcedly stopped, and the second electric control function is started), thereby further enhancing the reliability of the system.

Figure 2:
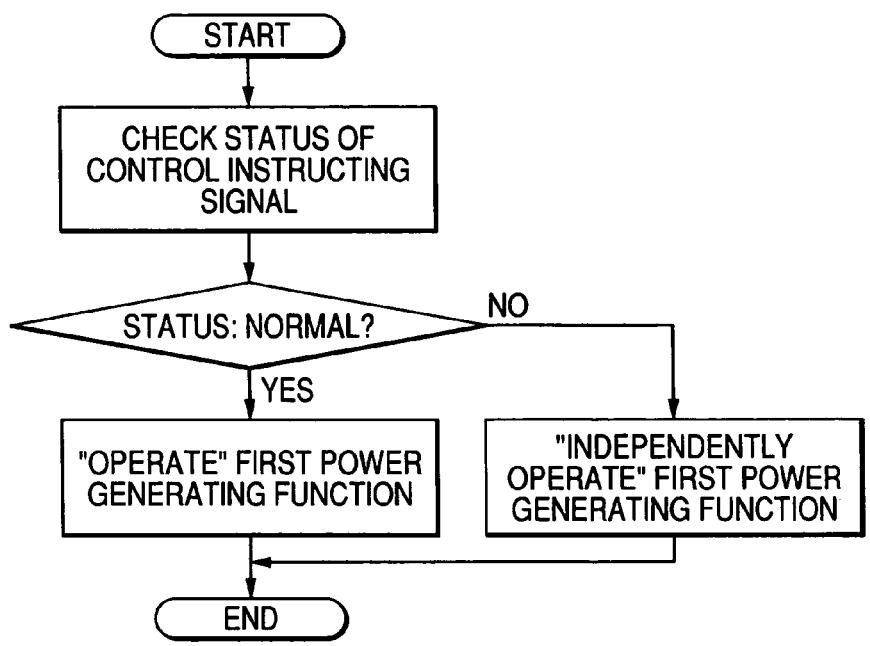
FIG. 2 is a flowchart showing the operation of a power converter according to the first embodiment.
Figure 3:
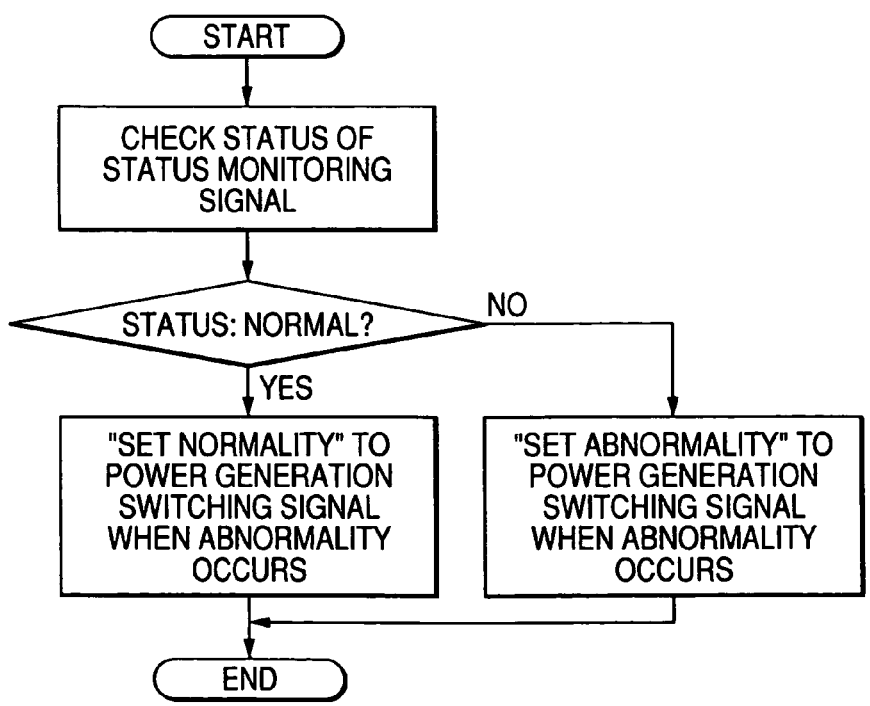
FIG. 3 is a flowchart showing the operation of a monitoring control device according to the first embodiment.

FIGS. 2 and 3 are flowcharts showing the operations of the power converter 1 and the monitoring control device 2 respectively, and the power converter 1 and the monitoring control device 2 operate independently of each other. In FIGS. 2 and 3, "independent operation" shows that a predetermined fixed operation is carried out when there is no control instruction from the monitoring control device 2.

According to the embodiment described above, not only when abnormality occurs in the microcomputer 10 and the power converter 1, but also when a circuit which is not directly involved in the electric generation control breaks down, for example, when the interface circuit between the power converter 1 and the monitoring device 2 breaks down or the like, the sufficient power needed for continuous traveling of a vehicle can be supplied without stopping the electric control operation which is the main function of the power converter 1.

Second Embodiment

Figure 4:
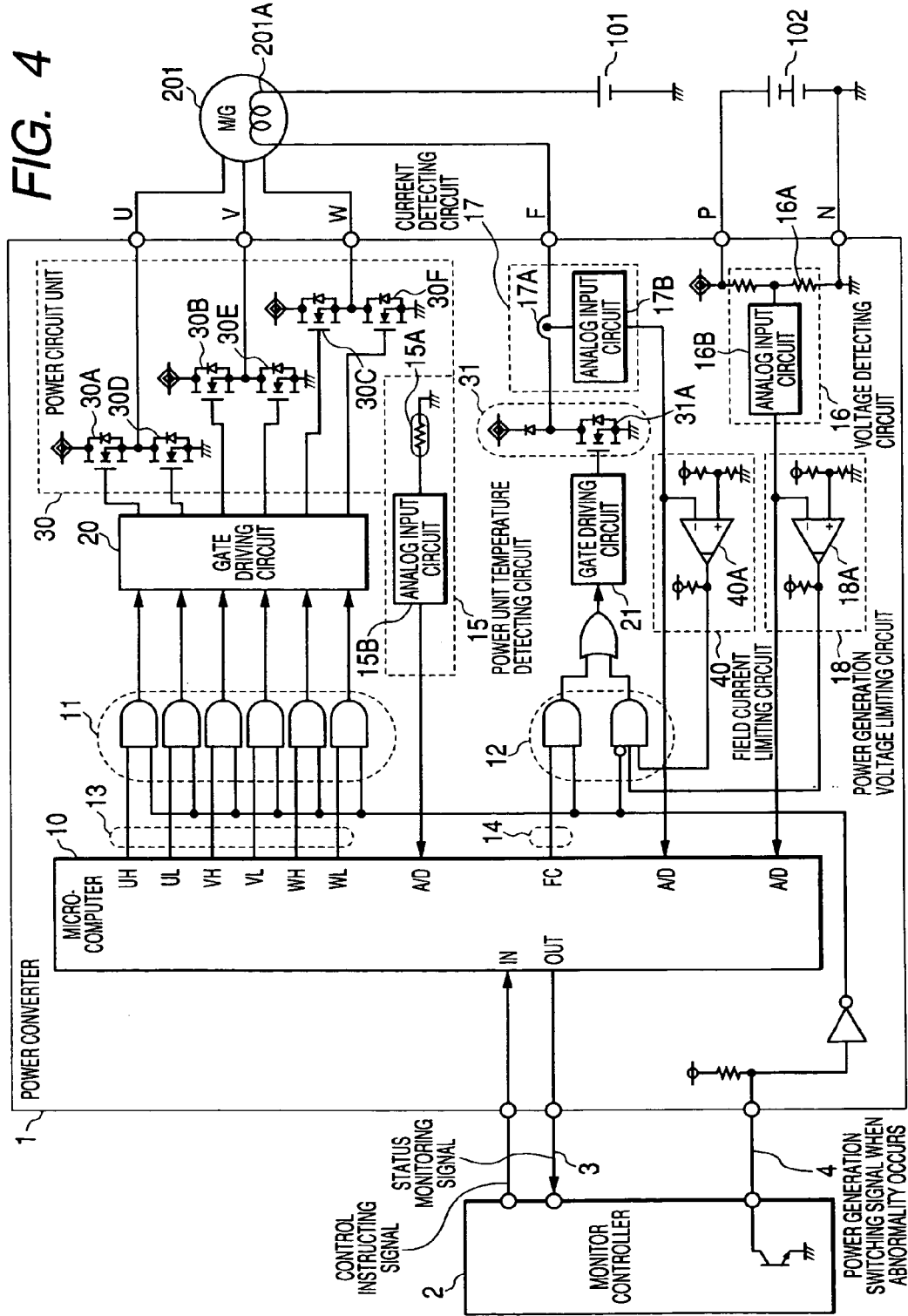
FIG. 4 is a block diagram showing a circuit construction of a vehicle power control device according to a second embodiment of the present invention.

In this embodiment, a field current limiting circuit 40 containing a comparator 40A is added to the output side of the current detecting circuit 17 as shown in FIG. 4, and even when the voltage detected by the voltage detecting circuit 16 described above is lower than a predetermined value, the field coil driving circuit 31 is set to OFF if the current value detected by the current detecting circuit 17 is not less than a predetermined value. This embodiment is effective to such a case that when a predetermined current value or more is supplied under some surrounding temperature environment, the field coil driving circuit 31 may be burned out on the field coil design aiming at the enhancement of the output performance of M/G.

Third Embodiment

Figure 5:
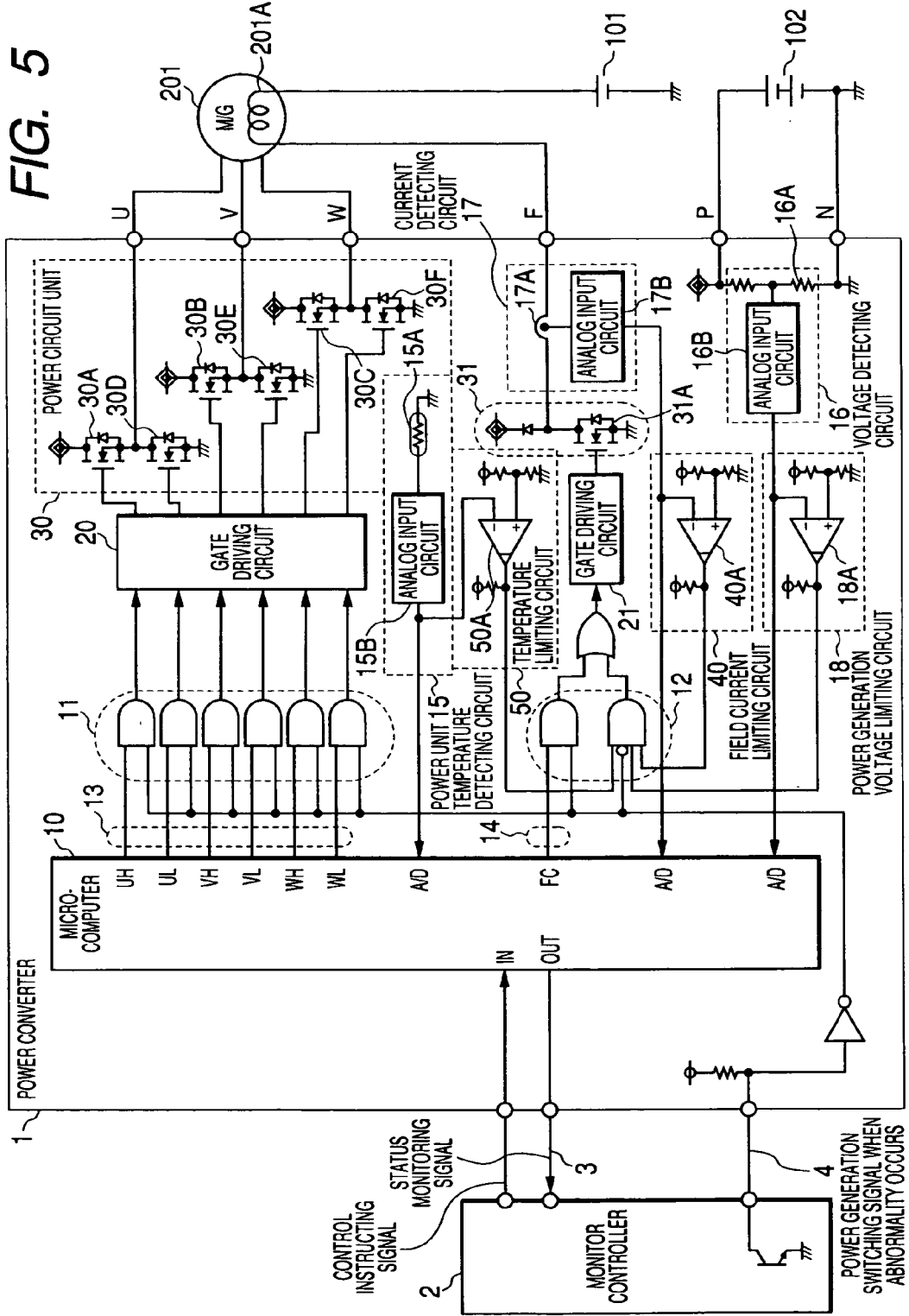
FIG. 5 is a block diagram showing a circuit construction of a vehicle power control device according to a third embodiment of the present invention.

In this embodiment, a temperature limiting circuit 50 containing a comparator 50A is added to the output side of the power unit temperature detecting circuit 15 as shown in FIG. 5. Even when the voltage detected by the voltage detecting circuit 16 is lower than a predetermined value and the current value detected by the current detecting circuit 17 is not more than a predetermined value, the field coil driving circuit 31 is set to OFF if the power unit temperature fed back from the power unit temperature detecting circuit 15 is not less than a predetermined value. Accordingly, the field coil current can be limited when the second electric generation control function is executed by inputting to the temperature limiting circuit 50 the detection signal of the power unit temperature detecting circuit 15 which detects the temperature of an existing power element or surrounding temperature with which the temperature of the existing power element can be estimated.

Fourth Embodiment

Figure 6:
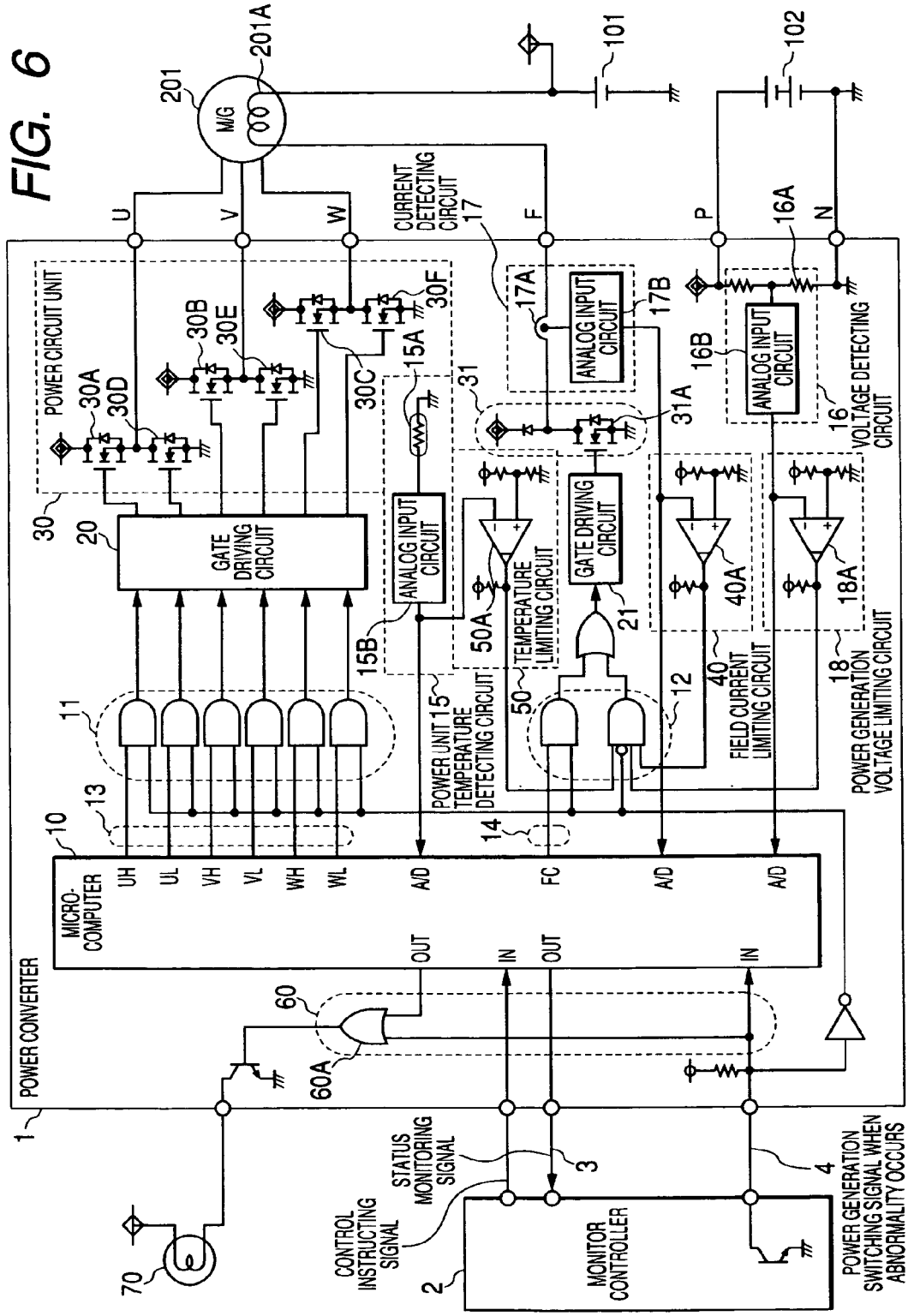
FIG. 6 is a block diagram showing a circuit construction of a vehicle power control device according to a fourth embodiment of the present invention.

In this embodiment, an alarm signal outputting circuit 60 containing an OR circuit 60A is added between the monitoring control device 2 and the microcomputer 10 as shown in FIG. 6, and an alarm signal is output to the external (in FIG. 4, an alarm lamp 70 is turned on) by utilizing the status of the abnormality-occurrence electric generation switching signal 4. By forcedly driving an alarm device which is normally controlled to be turned on/off by an output signal from the microcomputer 10, occurrence of breakdown can be notified to the driver irrespective of the status of the microcomputer 10 when the first electric generation function is stopped.

By inputting the abnormality-occurrence electric generating switching signal 4 to the microcomputer 10 at the same time, the microcomputer 10 can recognize the stop of the first electric generation function due to a wire breaking trouble of the abnormality-occurrence electric generation switching signal 4, and suppress abnormality erroneous detection of the feedback operation system of voltage or current. In addition, a safety countermeasure such as suppression of electrical load power consumption of an electric vehicle or the like can be taken by transmitting the status monitoring signal 3 to the monitoring control device 2, thereby constructing an electric generation control system which is also excellent in safety.

Figure 7:
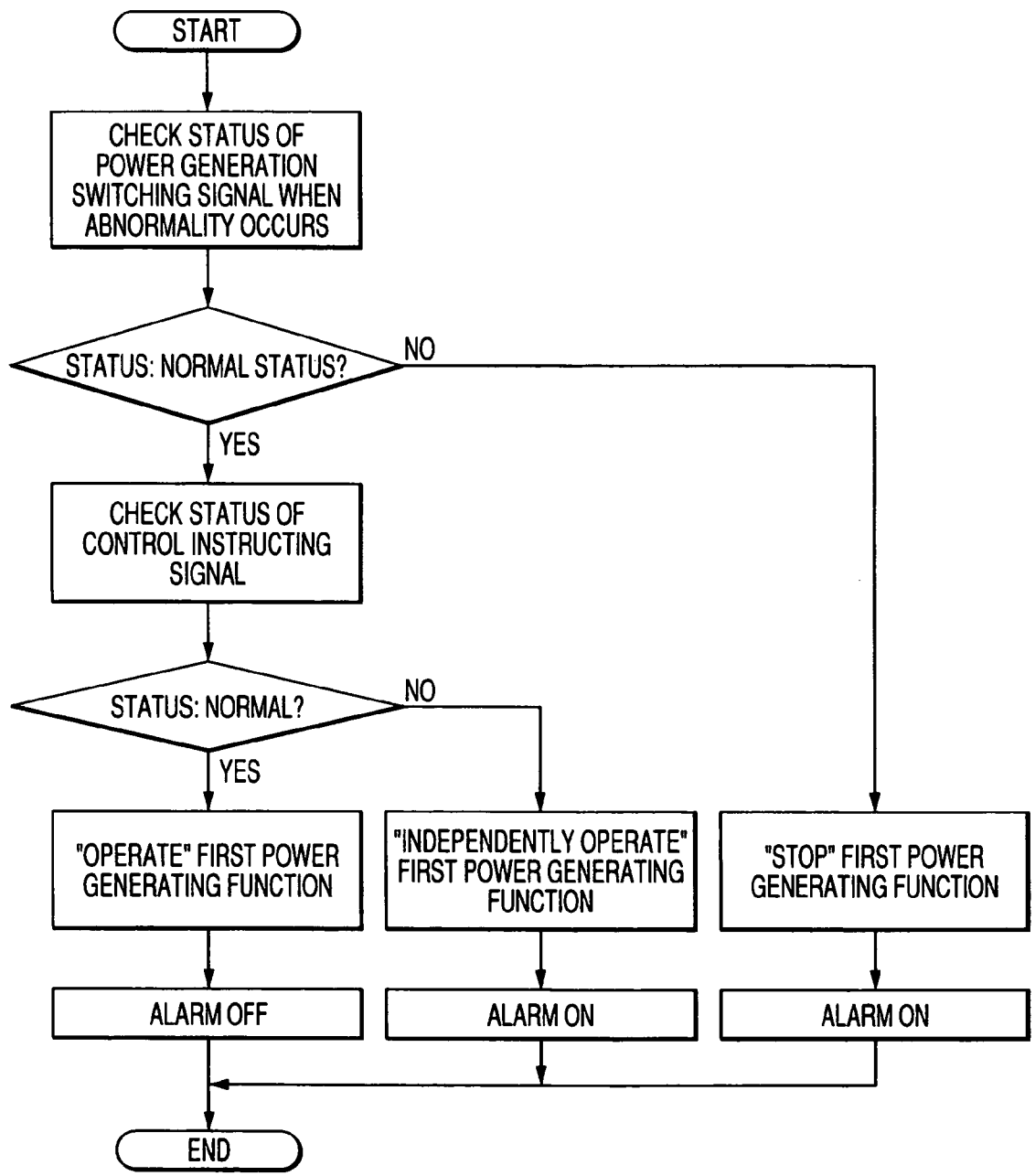
FIG. 7 is a flowchart showing the operation of a power converter according to the fourth embodiment.

FIG. 7 is a flowchart showing the operation of the power converter 1 of the fourth embodiment, and FIG. 8 is a diagram showing the relationship between the status of the control instruction signal of the monitoring control device 2, the status monitoring signal 3 and the abnormality-occurrence electric generation switching signal 4 and the operation status of the power converter 1 in the fourth embodiment. In FIG. 8, "–" represents the function stopped state, and when "independent operation" represents a predetermined fixed operation when there is no control instruction from the monitoring control device 2.

The present invention may be used as a vehicle power control device mounted in an electric vehicle, a hybrid vehicle or the like.

What is claimed is:

1. A vehicle power control device for controlling driving power and electric generation power of a motor generator mounted in a vehicle by using a power converter containing a power element and a power element driving signal generating means for generating a signal to drive the power element, comprising:

a monitoring control device for monitoring the status of the power converter and outputting an abnormality-occurrence electric generation switching signal when abnormality occurs under the control of the electric generation power of the motor generator, wherein a first electric generation control function is executed corresponding to the output of the power element driving signal generating means under a state where there is no output of the abnormality-occurrence electric generation switching signal, and the output of the power element driving signal generating means is stopped when there is an output of the abnormality-occurrence electric generation switching signal, thereby executing a second electric generation control function based on a diode rectifying mode of the power element.

2. The vehicle power control device according to claim 1, further comprising electric generation voltage limiting means for limiting an electric generation voltage to a fixed voltage, based on the second electric generation control function.

3. The vehicle power control device according to claim 1, wherein when a wire breaking trouble occurs in a transmission line of the abnormality-occurrence electric generation switching signal, the first electric generation control function is forcedly stopped, and the second electric generation control function is started.

4. The vehicle power control device according to claim 1, further comprising a field coil current limiting means for limiting a field coil current of the motor generator when the second electric generation control function is executed, by using a detection signal of a field coil current detecting means for detecting the field coil current of the motor generator.

5. The vehicle power control device according to claim 1, further comprising temperature limiting means for limiting a field coil current of the motor generator when the second electric generation control function is executed, by using a detection signal of a power unit temperature detecting means for detecting the temperature of the power element or the surrounding temperature thereof.

6. The vehicle power control device according to claim 1, further comprising an alarm signal outputting means for outputting an alarm signal when abnormality occurs in the power converter during execution of the second electric generation control function.

* * * * *